United States Patent Office 3,781,205
Patented Dec. 25, 1973

3,781,205
COMPOSITE BEARINGS
James Cairns and Nicholas Walton, Cherry Hill, N.J., assignors to Garlock, Inc., Palmyra, N.Y.
No Drawing. Filed Feb. 2, 1970, Ser. No. 8,065
Int. Cl. C10m 7/34
U.S. Cl. 252—12.6         12 Claims

ABSTRACT OF THE DISCLOSURE

A composite bearing comprising a backing member to which there is secured a dimensionally stable bearing surface layer comprising a solid lubricant selected from the group consisting of the sulfides, selenides, and tellurides of molybdenum, tungsten, and titanium, lead diiodide, boron nitride, carbon, graphite, and polytetrafluoroethylene and fibers of a material characterized by a heat distortion temperature exceeding that of polytetrafluoroethylene and selected from the class consisting of aromatic polyamides, carbon, graphite, aromatic polysulfones, aromatic polyimides and aromatic polyester-imides.

BACKGROUND OF THE INVENTION

Field of the invention

This invention relates to plain bearings and, more particularly, to a composite bearing structure including a high tensile strength, dimensionally stable bearing surface including a solid lubricant and fibers of a material characterized by a heat distortion temperature greater than that of polytetrafluoroethylene.

DESCRIPTION OF THE PRIOR ART

Composite bearings whose low friction or bearing surfaces are composed of fibers of polytetrafluoroethylene (hereinafter PTFE) are known, and are described, for example, in U.S. Pats. Reissue 24,675—White; 2,953,418—Runton et al.; 3,110,530—Herman; 3,131,979—Shobert; and 3,328,100—Spokes et al. Such composite bearings generally include a bearing surface layer formed of PTFE fibers which are interwoven with other fibers (such as cotton) to facilitate the bonding of the low friction bearing surface to a supporting structure. Because of the low coefficient of friction of PTFE and the increased physical properties of the material in fiber form, such bearing structures have found wide acceptance in applications where relatively high bearing loads are encountered. However, the inherent characteristics of PTFE have severely restricted use of such composite bearings in high temperature-high load applications. Specifically, PTFE is dimensionally unstable in the sense that it deforms more easily under load as the temperature is increased either by environmental temperature change or frictional heat, and is unfortunately characterized by a heat distortion temperature which is unacceptable for applications in which high loads are encountered at elevated temperatures. In fact, PTFE fibers exhibit a zero strength temperature of 590° F.

SUMMARY OF THE INVENTION

It is accordingly a primary object of the invention to provide a composite bearing structure including a bearing surface layer comprising a solid lubricant and fibers which exhibit good dimensional stability and which are useful in high temperature applications in which PTFE fiber bearings exhibit increased deformation and wear. Briefly stated, the composite bearing according to one form of the invention comprises a backing member to which there is secured a high tensile strength, dimensionally stable bearing surface including a solid lubricant and fibers of a material characterized by a heat distortion temperature exceeding that of polytetrafluoroethylene and selected from the group consisting of aromatic polyamides, carbon, graphite, aromatic polysulfones, aromatic polyimides and aromatic polyester-imides.

The bearings of the invention are characterized by a significantly increased load carrying capacity with increased temperature as compared with PTFE fiber-lined bearing structures. By incorporating high temperature resistant solid lubricants in the interstices of the fibers forming the low friction face of the bearings of the invention, they may be made to equal and to exceed the bearing life of comparable PTFE fiber-faced bearing structures. Moreover, the fibrous materials used to provide the bearings of the invention are not handicapped by the nonadhesive properties characteristic of PTFE. Accordingly, the fibers used in forming the low friction surface of the bearings of the invention can be easily and conveniently bonded to the backing or supporting structure with conventional adhesives and cements without the necessity of employing intricate interweaving operations for producing a composite fiber or a compound woven fabric in order to facilitate bonding to the backing member as was heretofore necessary when using PTFE fibers.

Generally, any of the well known carbon and graphite fibers may be used to provide the bearing surface of the bearings of the invention. For example, graphitized monofilaments or fibers of the type described in U.S. Pat. 3,107,152 can be used.

The aromatic polyamides useful in the practice of the invention include the linear polymers produced by the interfacial polycondensation of an aromatic dibasic acid chloride such, for example, as phthaloyl chloride, isophthaloyl chloride or terephthaloyl chloride, with an aromatic diamine such, for example as ortho-, meta- or para-phenylenediamine, bezidine or 4,4'-diaminodiphenylmethane. A particularly preferred aromatic polyamide is poly (m-phenyleneisophthalamide) produced and marketed by the Du Pont Company under the trade designation "Nomex" and characterized by a breaking strength at 482° F. equivalent to 60% of that at room temperature. Other suitable aromatic polyamides useful in the practice of this invention as well as methods for their preparation are described in New Linear Polymers, by Lee, Stoffey and Neville, McGraw Hill Book Company, 1967, whose disclosure, by reference, is hereby incorporated as part of the disclosure of this invention.

The aromatic polysulfones useful in the practice of the invention include the linear, high molecular weight polyaryl sulfones such, for example, as may be produced by reacting the disodium salt of an aromatic dithiol with a dihalodiphenyl sulfone. Specific examples of starting materials and methods used in preparing aromatic polysulfones are described in the aforesaid text New Linear Polymers. A preferred polysulfone useful in the practice of the invention is obtained by reacting the disodium salt of bisphenol-A with p,p'-dichlorodiphenylsulfone in dimethyl sulfoxide and chlorobenzene.

The aromatic polyimides useful to provide the bearings of the invention include the aromatic polyimides made by reacting a dianhydride such, for example, as pyromellitic dianhydride, with an aromatic diamine such, for example, as meta- or para-phenylenediamine. A specific example of a polyimide which may be used is the high molecular weight polymeric product of the reaction of 4,4' diaminodiphenyl methane with pyromellitic dianhydride. Further examples of typical diamines and dianhydrides useful in the production of polyimides such as may be used in the practice of the invention are disclosed in the text New Linear Polymers referred to above.

The aromatic polyester-imides that may be used to provide the low friction bearing surface layer in accordance with the present invention include the reaction products of an aromatic diamine, such as m-phenylenediamine, with a dianhydride containing aromatic ester links such, for example, as may be prepared by the reaction of trimellitic anhydride with a diacetoxy derivative of an aromatic diol, preferably hydroquinone. A specific aromatic polyester-imide which can be used in the practice of the invention is the polymeric product of the reaction of m-phenylenediamine with p-phenylene-bis(trimellitate anhydride). Other suitable starting materials and methods employed in the preparation of aromatic polyester-imides of the type which may be used in the practice of this invention are disclosed in the text New Linear Polymers referred to above.

Each of the foregoing materials useful in the practice of the invention, i.e. aromatic polyamides, carbon, graphite, aromatic polysulfones, aromatic polyimides, and aromatic polyester-imides are characterized by heat deflection temperatures (as measured by A.S.T.M. Test Method D-648) exceeding that of PTFE, i.e., exceed 250° F. at 66 p.s.i. fiber stress, and exceed 130° F. at 264 p.s.i. fiber stress.

The bearing or low friction surface layer of the bearings of the invention can include a single layer or, if preferred, multiple layers of fibers or yarns of at least one of the foregoing materials. The fibers comprising the low friction face of the bearing can be braided or woven. If desired, a combination of two or more different materials of the kind described above can be employed to provide a composite fiber or compound woven fabric for use in preparing the bearing surface.

To produce a sleeve bearing in accordance with the invention, a strip or tape woven of yarns or threads of the selected low friction material may be wrapped over a mandrel to form a compact inner bearing surface composed of the yarns or threads of the low friction material. Alternatively, the yarns or threads of the selected low friction material may be wound or braided over the mandrel under tension in any other suitable form, as for example, in a pair of crossed helical layers of opposite pitch to form a compact inner bearing surface composed entirely of the yarn employed. The yarn used in the practice of the invention can be formed of monofilament thread or of a twisted thread made of smaller component fibers of the material selected. If desired, the yarns or threads can be preimpregnated with a suitable resin impregnant adhesive to facilitate bonding with the backing member as will be described below.

After the desired thickness of fibers or yarns has been wrapped, wound, or braided about the mandrel, the assembly can be over-wrapped with the required thickness of filament winding or with a wrapping of structural resin preimpregnated fabric to provide the reinforcing member of the composite bearing. Examples of suitable material for use in this connection are glass/epoxy, glass/polyester, glass/phenolic, linen/phenolic and cotton/phenolic. Other filaments, fabrics and suitable resin impregnants for providing the backing member will readily occur to those skilled in the art.

Upon completion of the application of the filament winding or the fabric wrapping, the resin impregnant is cured by conventional techniques and the assembly cooled and subsequently removed from the mandrel. The amount of finish machining, if any, will depend upon the tolerances required in a specific bearing application. Shaft bushings with the bearing surface on the outside can be produced by reversing the foregoing procedure. Similarly, flat stock and other forms can be produced by laminating a woven cloth composed of the desired low friction material of the type described to an appropriate resin preimpregnated fabric.

As will be appreciated by those skilled in the art, other rigid backing or supporting members may be employed to provide the composite bearing structures of the invention. For example, the low friction bearing surface including the fibers of the materials herein contemplated can be bonded through the means of an adhesive to a suitable metal backing or housing such as, for example, composed of iron, steel, copper, aluminum, brass, bronze, nickel, or titanium. Metal backings of this type lend themselves to platen-press manufacture of composite bearing material of the invention. In addition, the metal backings are useful in the production of coils of the composite material from which the bearings of the invention may be economically produced.

The adhesives which may be used to secure the bearing surface layer (or low friction lamina) to the backing member (or supporting lamina) to provide the composite bearing in accordance with the invention may be any of the well known high temperature adhesives or bonding resins which do not unduly decompose at the temperatures at which the bearing surface is to be used, and which have the capacity to assure a good, high strength bond between the fibrous low friction layer and the particular backing material employed. In general many of the epoxy, modified epoxy, polyimide, phenolic, or polyester adhesives may be advantageously employed. Examples of suitable adhesives include "Epoxylite 5403" and "Epoxylite 6203" sold by Epoxylite Corporation; "Leal C" sold by the Leal Company; and "ERL 256" sold by Union Carbide. Other suitable adhesives include phenolic cements such as "Armstrong N-101" sold by Armstrong Cork Company and "Resinox EXEL 533" and "Resinox EXEL 530" sold by Monsanto. Polyimide cement such as "Metabond 840" sold by Whittaker Corporation may also be used.

The solid lubricant employed to enhance the low friction characteristics of the bearings of the invention is generally in the form of fine particles, and can be dispersed in the resin used to impregnate either the low friction fabric or fibers, or the fabric or fibers used to provide the reinforcing backing member. Alternatively, the solid lubricant can be dispersed throughout the adhesive used to secure the low friction fabric layer to the backing member. Thus, the solid lubricant particles can be present at the bearing surface and throughout the interstices in and between the fibers forming the bearing surface.

The solid lubricants useful to provide the bearings of the invention can be selected from the sulfides, selenides and tellurides of molybdenum, tungsten and titanium, lead diodide, boron nitride and carbon, graphite or PTFE. The resin impregnant or adhesive in which the solid lubricant is distributed can include up to 30% by weight of the solid lubricant. The term "solid lubricant" as used herein is meant to embrace a solid lubricant composition which does not decompose unduly at 300° C., readily smears on metal surfaces and, when tested in a dynamic friction testing machine between two metal surfaces, shows a coefficient of friction below 0.15.

A preferred form of the invention comprises a composite bearing structure whose low friction surface includes a solid lubricant and a woven fabric of carbon or graphite fibers adhesively secured to a rigid metal backing, as of steel for example. The low friction characteristics of such a structure are enhanced by utilizing particulate PTFE, with or without one or more particulate filler materials, as the solid lubricant. In this connection, PTFE impregnated graphitized monofilaments or fibers of the type described in U.S. Pat. 3,107,152 may be used. Alternatively, a mixture of particulate PTFE and filler, if desired, may be spread evenly over the low friction carbon or graphite fiber surface of the composite bearing, and the thus coated bearing compressed under sufficient heat and pressure to cause the particles to penetrate into and throughout the interstices in and between the graphite or carbon fibers and to sinter the PTFE. If desired, the particulate PTFE (and filler, if any) may be applied to the woven carbon or graphite low friction surface of the composite bearing in the form of a thin, flexible mat such, for example, as described in British Pat. 1,163,950. Examples of specific PTFE materials as well as suitable fillers are set forth in the aforesaid British patent which is, by reference, incorporated as part of the disclosure of this invention.

As will be appreciated by those skilled in the art, the present invention contemplates composite bearing structures which include at least two components: (1) a low friction bearing surface lamina including a solid lubricant and fibers of one or more of the aforementioned materials, and (2) a rigid supporting backing lamina adhesively secured to the low friction surface. In general, the rigid supporting structure or backing will be composed of a material other than that used to provide the bearing or low friction surface. However, it is within the purview of the invention to construct the backing lamina of the same material, of which the fibers are formed, which material has been so modified or treated to render it sufficiently rigid to provide the support necessary in any specific bearing application. For example, where the bearing surface is formed of a cloth woven of fibers of one of the preferred materials, the backing member may comprise additional layers of such cloth that have been impregnated with a reinforcing resin which is subsequently cured to provide the desired rigidity. Alternatively, the fibrous bearing surface of one of the preferred materials can be adhered to a reinforcing backing molded of the identical material. Consequently, while from a structural standpoint the bearings of the invention are considered to be and have here been referred to as "composite bearings" it should be understood that the supporting backing and the fibrous low friction surface layer can be composed of the same material.

It should be understood that while the present invention has been described in considerable detail with respect to certain specific embodiments thereof, it is not to be considered limited to those embodiments, but may be used in other ways without departure from the spirit of the invention or the scope of the appended claims.

What is claimed is:

1. A bearing element comprising a composite structure including, in combination, a low friction bearing lamina consisting essentially of yarns formed of monofilament thread, multifilament thread or of a twisted thread made up of small component fibers of a material characterized by a heat deflection temperature as measured by A.S.T.M. Test Method D-648, exceeding 250° F. at 66 p.s.i. fiber stress and exceeding 130° F. at 264 p.s.i. fiber stress, and selected from the class consisting of aromatic polyamides, carbon, graphite, aromatic polysulfones, aromatic polyimides and aromatic polyesterimides, said yarns forming said lamina being impregnated with a resin bonding material, said lamina including, in the interstices in and between the yarns forming said lamina, particles of a solid lubricant selected from the group consisting of inorganic compounds, elements, and organic polymers which does not decompose unduly at 300° C., which readily smears on metal surfaces, and which when tested on a dynamic friction testing machine between two metal surfaces shows a coefficient of friction below 0.15, and a rigid supporting lamina bonded to said low friction bearing lamina by means of said resin bonding material.

2. The bearing of claim 1 wherein the solid lubricant is selected from the group consisting of the sulfides, selenides, and tellurides of molybdenum, tungsten, and titanium, lead diiodide, boron nitride, carbon, graphite, and polytetrafluoroethylene and wherein the bonding material is selected from the group consisting of polyepoxy, polyimide, phenolic, and polyester adhesives.

3. The bearing of claim 1 in which said yarns are formed of poly(m-phenyleneisophthalamide).

4. The bearing of claim 1 in which said yarns are formed of carbon.

5. The bearing of claim 1 in which said yarns are formed of graphite.

6. The bearing of claim 1 in which said yarns are formed of an aromatic polysulfone.

7. The bearing of claim 1 in which said yarns are formed of an aromatic polyimide.

8. The bearing of claim 1 in which said yarns are formed of an aromatic polyester-imide.

9. The bearing of claim 1 in which the solid lubricant comprises particulate polytetrafluoroethylene.

10. The bearing element of claim 1 wherein said rigid supporting lamina comprises a cured, hardenable resin including resin bondable reinforcing filaments of fibers embedded therein.

11. The bearing of claim 1 in which said backing member comprises a rigid metal structure.

12. The bearing of claim 9 in which the solid lubricant comprises particulate polytetrafluoroethylene.

References Cited

UNITED STATES PATENTS

| | | | |
|---|---|---|---|
| 3,533,668 | 10/1970 | Tunis | 252—12 |
| 3,629,103 | 12/1971 | Korshak et al. | 252—12 |
| 3,647,500 | 3/1972 | Mizuno | 252—12.2 |
| 3,107,152 | 10/1963 | Ford et al. | 23—209.2 |
| 3,305,325 | 2/1967 | Le Brasse et al. | 252—12 |
| 2,849,414 | 8/1958 | Stott | 252—12 |
| 2,953,418 | 9/1960 | Runton et al. | 252—12 |
| 3,110,530 | 11/1963 | Herman | 252—12.2 |
| 3,131,979 | 5/1964 | Shobert | 252—12.6 |
| 3,405,063 | 10/1968 | Boes et al. | 252—12 |
| 3,480,547 | 11/1969 | Van Dyk | 252—12.6 |
| 3,567,504 | 3/1971 | Hopkins et al. | 252—12.4 |

FOREIGN PATENTS

| | | | |
|---|---|---|---|
| 1,124,781 | 8/1968 | Great Britain | 252—12 |
| 767,820 | 2/1957 | Great Britain | 252—12 |
| 1,163,950 | 9/1969 | Great Britain | 252—12 |

DANIEL E. WYMAN, Primary Examiner

I. VAUGHN, Assistant Examiner

U.S. Cl. X.R.

252—12, 12.4

PO-1050
(5/69)

UNITED STATES PATENT OFFICE
CERTIFICATE OF CORRECTION

Patent No. 3,781,205     Dated December 25, 1973

Inventor(s) James Cairns and Nicholas Walton

It is certified that error appears in the above-identified patent and that said Letters Patent are hereby corrected as shown below:

Column 6, claim 12 should be made dependent from claim 11, and should read as follows:

12. The bearing of claim 11 in which the solid lubricant comprises particulate polytetrafluoroethylene.

Signed and sealed this 9th day of July 1974.

(SEAL)
Attest:

McCOY M. GIBSON, JR.
Attesting Officer

C. MARSHALL DANN
Commissioner of Patents